United States Patent
Smith et al.

(10) Patent No.: US 9,429,480 B2
(45) Date of Patent: Aug. 30, 2016

(54) OPTICAL FIBRE DISTRIBUTED LHD WITH SMA ELEMENT FOR DISCRETE ALARM

(71) Applicant: Kidde Technologies, Inc., Wilson, NC (US)

(72) Inventors: Paul D. Smith, Camberley (GB); Paul Rennie, Bracknell (GB); Beth A. Dutson, Hampshire (GB)

(73) Assignee: Kidde Technologies, Inc., Wilson, NC (US)

( * ) Notice: Subject to any disclaimer, the term of this patent is extended or adjusted under 35 U.S.C. 154(b) by 278 days.

(21) Appl. No.: 14/152,762

(22) Filed: Jan. 10, 2014

(65) Prior Publication Data
US 2015/0192476 A1 Jul. 9, 2015

(30) Foreign Application Priority Data

Jan. 7, 2013 (GB) .................................. 1300207.6
Jan. 6, 2014 (EP) ..................................... 14150217

(51) Int. Cl.
*G01K 11/32* (2006.01)
*G01K 5/48* (2006.01)

(52) U.S. Cl.
CPC .............. *G01K 11/32* (2013.01); *G01K 5/483* (2013.01); *G01K 11/3206* (2013.01); *G01K 2011/322* (2013.01); *G01K 2011/324* (2013.01)

(58) Field of Classification Search
None
See application file for complete search history.

(56) References Cited

U.S. PATENT DOCUMENTS

| | | | |
|---|---|---|---|
| 4,362,057 A | 12/1982 | Gottlieb et al. | |
| 5,024,497 A | 6/1991 | Jebens | |
| 5,641,955 A * | 6/1997 | Bonniau | G01D 5/35383 250/227.14 |
| 5,745,611 A | 4/1998 | Komachiya et al. | |
| 5,876,434 A * | 3/1999 | Flomenblit | A61C 8/0033 433/172 |
| 6,266,461 B1 | 7/2001 | Takahashi | |
| 6,367,250 B1 | 4/2002 | Baumbick | |
| 7,170,590 B2 | 1/2007 | Kishida | |
| 7,719,666 B2 | 5/2010 | Kishida et al. | |
| 7,992,440 B2 | 8/2011 | Kumagai et al. | |
| 8,220,259 B1 | 7/2012 | Cripe et al. | |
| 8,285,086 B2 | 10/2012 | Nishikawa et al. | |
| 8,966,893 B2 * | 3/2015 | Mance | F03G 7/065 427/256 |
| 2013/0096426 A1 * | 4/2013 | Levy | A61B 8/4461 600/425 |

FOREIGN PATENT DOCUMENTS

| | | | | |
|---|---|---|---|---|
| CA | WO 9822042 A2 * | 5/1998 | | A61F 2/88 |
| GB | 2509530 A * | 7/2014 | | G01K 5/483 |
| JP | 3344366 B2 | 11/2002 | | |

* cited by examiner

Primary Examiner — Andre Allen
(74) Attorney, Agent, or Firm — Kinney & Lange, P.A.

(57) ABSTRACT

A temperature sensing system 10 comprises an optical waveguide 102, a shape memory alloy (SMA) element 106a, and an interrogator 12. The SMA element 106a is deformable as a function of temperature and at least partially surrounds the optical waveguide 102. The interrogator 12 is configured to detect distributed temperature along the optical waveguide 102 using spectroscopy and to detect strain in the optical waveguide 102 induced by deformation of the SMA element 106a to identify local hot spots along the optical waveguide 102.

13 Claims, 2 Drawing Sheets

OPTICAL FIBRE DISTRIBUTED LHD WITH SMA ELEMENT FOR DISCRETE ALARM

CROSS-REFERENCE TO RELATED APPLICATION(S)

This application claims priority to foreign patent application EP 14150217.9, filed Jan. 6, 2014, which is hereby incorporated by reference in its entirety.

BACKGROUND

The present invention relates generally to sensors, and more particularly to optical fiber sensor elements for heat and fire detection.

Fiber optic sensors are currently used to measure a wide range of parameters in distributed systems ranging from construction sites to aircraft wings. Some such sensors include pressure, strain, and temperature sensors, but fiber optics may qualitatively be used to measure any quantity that can be tied to the physical parameters of a fiber optic sensing element. Fiber optic temperature sensors, for instance, operate by detecting thermal expansion of a fiber optic strand, or of a surrounding sheath around, or gap between, strand segments with an interferometer. A data processor correlates this change in the physical parameters of the fiber optic sensing element with a corresponding change in temperature.

Most fiber optic temperature sensors comprise a fiber optic sensing element and an interrogator with a light source, a spectrometer, and a data processor. The sensing element consists of a fiber optic strand that extends from the interrogator into a sensing region. During operation, the light source of the interrogator emits light down the fiber optic sensing element. Changes in temperature alter the physical parameters of the sensing element, and thus its optical characteristics. The spectrometer and data processor assess these differences to identify changes in temperature.

Modern temperature sensors utilize a wide range of spectroscopy and interferometry techniques. These techniques generally fall into two categories: point and quasi distributed sensing based on Fiber Bragg Gratings (FBGs), and fully distributed sensors based on Raman, Brillouin, or Rayleigh scattering. The particular construction of fiber optic sensing elements varies depending on the type of spectroscopy used by the sensor system, but all fiber optic sensors operate by sensing changes in physical parameters of the fiber optic sensing element. Raman distributed sensors, for instance, determine a temperature from inelastic light scattering from thermally excited molecular vibrations within the silicon dioxide glass of the optical fiber core. Scattered light undergoes a spectral shift with respect to the wavelength of the incident light. This generates a higher wavelength Stokes component and a lower wavelength anti-Stokes component. The intensity of the so-called anti-Stokes band is temperature-dependent, whereas the Stokes band is almost independent of temperature. The temperature is derived from the ratio of the intensity of the anti-Stokes and Stokes components.

Many temperature sensing systems are required to detect both diffuse overheat conditions corresponding to region- or system-wide increases in temperature, and local overheat conditions corresponding to hot spots as small as 25 mm or less. To sense local temperature, conventional optical fiber sensing elements must have spatial measurement resolution at least as fine as the minimum heated length required to generate an alarm condition corresponding to such a hot spot. This high spatial resolution requirement increases the cost and complexity of optical fiber temperature sensors, and increases the time taken to acquire temperature measurements.

SUMMARY

The present invention is directed toward a temperature sensing system comprising an optical fiber, a shape memory alloy (SMA) element, and an interrogator. The SMA element is deformable as a function of temperature, and surrounds the optical fiber. The interrogator is configured to detect distributed temperature along the optical fiber using spectroscopy, and to detect strain in the optical fiber induced by deformation of the SMA sheath to identify local hot spots along the optical fiber.

DETAILED DESCRIPTION

Figure 1:
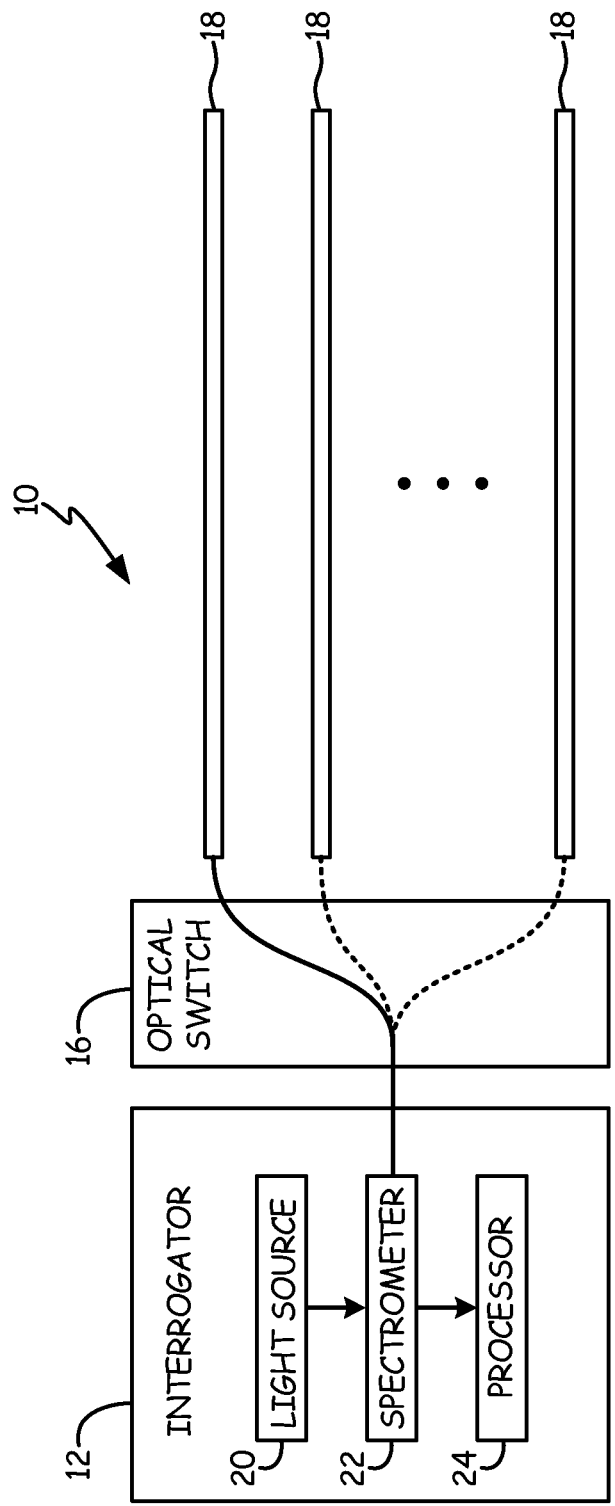
FIG. 1 is a schematic block diagram of a sensing system according to the present invention.

FIG. 1 is a schematic block diagram of optical waveguide sensing system 10, comprising interrogator 12, optical switch 16, and sensing elements 18. Interrogator 12 includes light source 20, detector 22, and data processor 24. Optical waveguide sensing system 10 may be used to sense fires or overheat conditions in a wide range of applications, including on aircraft and other vehicles.

Interrogator 12 is an optical interrogator configured to flag alarm conditions corresponding to overheat conditions detected from changes in the optical characteristics of sensing elements 18. Light source 20 is a laser such as a broadband multi-laser light source capable of producing light at several wavelengths. Detector 22 is a high speed device capable of rapidly assessing relative shifts in spectrographic characteristics of light from sensing elements 18. Detector 22 may, for instance, be a high speed spectrometer, or a detector coupled to an individual band pass filter for each sensing element 18. Data processor 24 is a microprocessor or other logic-capable device configured to calculate temperature from these shifts in spectrographic characteristics of sampling light. Detector 22 and data processor 24 may use any spectroscopic technique suited to optical fiber temperature and strain sensing, including fully distributed methods using Rayleigh, Raman or Brillouin scattering techniques, or quasi-distributed Bragg scattering via fiber Bragg gratings (FBGs) distributed across each sensing element 18.

Sensing elements 18 are optical fiber sensing elements that extend from optical switch 16 to sensing locations within a target region to be monitored for overheat conditions, and are described in detail below with respect to FIGS.

2a, 2b, 3a, and 3b. Each sensing element 18 comprises at least one optical fiber at least partially sheathed or wrapped in shape memory alloy (SMA) material with a critical temperature selected to correspond with a local overheat temperature threshold $T_{localAlarm}$. Although sensing elements 18 are shown connected to interrogator 12 via optical switch 16 at only one end, alternative embodiments may form closed loops extending from and terminating at interrogator 18.

Although a plurality of sensing elements 18 are depicted in FIG. 1, the present invention may be practiced with any number of sensing elements. Systems with a plurality of sensing elements 18 may connect several sensing elements to a single detector 22 via an optical switch 16, as shown, or may connect each sensing element directly to a corresponding separate detector 22. Optical switch 16 reduces the overall cost and complexity of optical waveguide sensing system 10 by reducing the total number of detectors needed to interrogate a plurality of sensing elements 18, and may be controlled by data processor 24 to cycle through sensing elements 18 at a sampling rate selected to achieve a target special resolution.

During ordinary operation, interrogator 12 senses a low spatial resolution fully or quasi distributed temperature across each sensing element 18. This low spatial resolution may, for instance, be approximately 30 cm, or roughly twice to three times a minimum hotspot width required to produce a local overheat alarm (see below). The measured average temperature $T_{avg}$ is compared with an average temperature threshold $T_{avgAlarm}$ corresponding to an overheat condition alarm value. If $T_{avg}$ exceeds $T_{avgAlarm}$, data processor 24 identifies an overheat state and trips a distributed overheat alarm. Data processor 24 may, for instance, transmit an alarm message to a monitoring or control system, trigger an alarm light or siren, and/or archive the alarm condition with an alarm time for later analysis. Interrogator 12 also senses strain across each sensing element 18. Localized temperatures $T_{local}$ greater than local overheat threshold temperature $T_{localAlarm}$ induce a local shape change in the SMA sheath of sensing element 18 that is detected by interrogator 12, triggering a local overheat alarm. Like the distributed overheat alarm described above, the local overheat alarm may prompt transmission of an alarm message, trigger an alarm light or siren, or cause the alarm condition and time to be archived for later analysis.

Figure 2A:
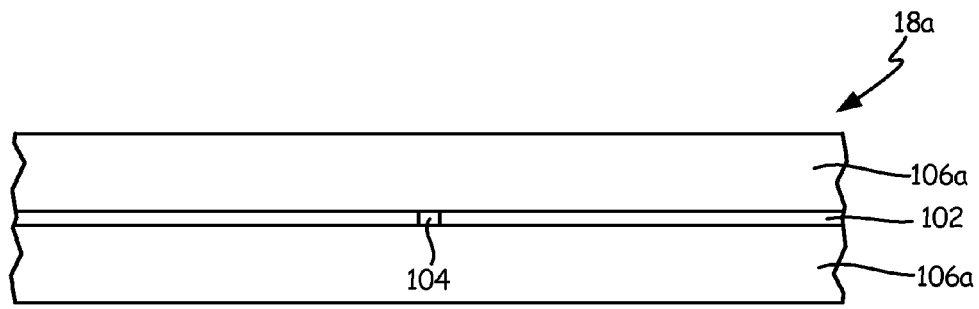
FIG. 2a is a simplified cross-sectional view of a first embodiment of a sensing element of the sensing system of FIG. 1 in an unstressed state.
Figure 2B:
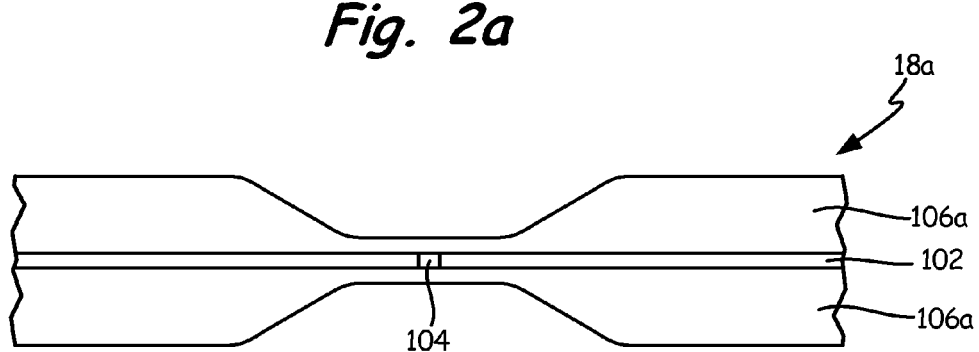
FIG. 2b is a simplified cross-sectional view of the embodiment of FIG. 2a in a stressed state corresponding to a local alarm condition.
Figure 3A:
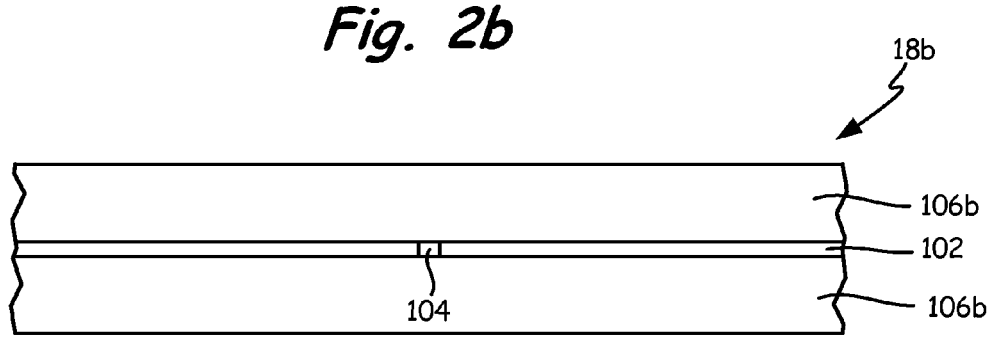
FIG. 3a is a simplified cross-sectional view of a second embodiment of a sensing element of the sensing system of FIG. 1 in an unstressed state.
Figure 3B:
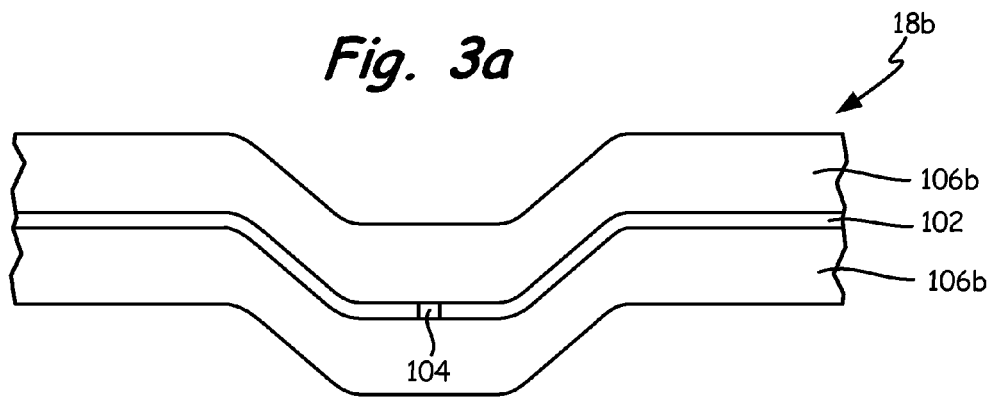
FIG. 3b is a simplified cross-sectional view of the embodiment of FIG. 3a in a stressed state corresponding to a local alarm condition.

FIGS. 2a and 2b illustrate sensing element 18a, one embodiment of sensing element 18, in an unstrained (FIG. 2a) and a strained (FIG. 2b) state. Sensing element 18a comprises optical waveguide 102 and SMA element 106a. Some embodiments of sensing element 18a further comprise FBG 104, although other embodiments may eschew FBGs and utilize other methods of spectroscopic temperature sensing. FIGS. 3a and 3b illustrate sensing element 18b, which is substantially identical to sensing element 18b, but comprises a different SMA element 106b, as described in further detail below.

Optical waveguide 102 is a unitary or composite optical guide such as an optical fiber, with known optical properties. Optical waveguide 102 may be formed of a series of spliced sections, which may in turn be separated by FBGs such as FBG 104. Alternatively, optical waveguide 102 may be formed in substantially a single piece. SMA element 106a is a tube or helix of SMA material that deforms to stress optical waveguide 102 at a critical temperature $T_{crit}$. SMA elements 106a and 106b may be tubes that fully enclose and protect optical waveguide 102. Alternatively, SMA elements 106a and 106b may be coils, springs, or similar structures that wrap around but do not fully enclose optical waveguide 102, allowing optical waveguide 102 to be directly exposed to its surrounding environment for increased temperature sensitivity. SMA elements 106a and 106b may, for instance, be formed of a Nickel-Titanium alloy with a Nickel/Titanium ratio selected as known in the art to produce an appropriate critical temperature $T_{crit}$. In alternative embodiments, SMA elements 106a and 106b may include Vanadium, Chromium, Manganese, Cobalt, Iron, Aluminum, Palladium, or Gold. In embodiments of optical waveguide sensing system 10 utilizing Bragg scattering, each measurement location is provided with at least one FBG 104 to sense strain either at or between adjacent FBGs 104.

FIGS. 2b and 3b illustrate the different responses of SMA elements 106a and 106b, respectively, to temperature above critical temperature $T_{crit}$. SMA element 106a responds to temperatures above $T_{crit}$ by constricting about optical waveguide 102, thereby compressing optical waveguide 102 and introducing corresponding strain detected by interrogator 12. SMA element 106b, by contrast, induces strain in optical waveguide 102 by bending to form a kink or turn in optical waveguide 102. SMA element 106a releases strain or stress upon returning to temperatures below critical temperature $T_{crit}$, thereby returning to the unstressed state of FIG. 2a. SMA element 106b, by contrast, requires external correction (e.g. via a restraining spring or sleeve, not shown) to un-kink and return to its pre-stressed state (FIG. 3a)

As described above, interrogator 12 senses average temperature along sensing element 18 using low resolution spectroscopy, but identifies local overheat conditions by sensing strain induced in optical waveguide 102 by deformation of SMA element 106a. Accordingly, the material of SMA elements 106a and 106b must be selected to have a critical temperature $T_{crit}$ substantially equal to local overheat temperature threshold $T_{localAlarm}$. In some embodiments, interrogator 12 may use a plurality of FBGs 104 disposed at or near measurement locations to sense both quasi-distributed temperature and strain. In other embodiments, interrogator 12 may use fully distributed temperature sensing techniques with cross sensitivity to strain, e.g. Rayleigh or Brillouin scattering techniques. In still further embodiments, interrogator 12 may use low resolution strain insensitive temperature sensing techniques (e.g. using Raman scattering) in conjunction with strain sensing by separate means (e.g. using Rayleigh scattering or polarization- or intensity-based strain sensing). Regardless of the particular technique selected, interrogator 12 utilizes both low resolution distributed temperature sensing and strain sensing. Low resolution distributed temperature sensing is used to identify distributed overheat alarm conditions, while strain sensing is used to identify localized hot spots. In this way, optical waveguide sensing system 10 dispenses with the need for any high resolution temperature sensing, while retaining the capacity to identify overheat conditions confined to small areas. For applications wherein the location of a localized hot spot is needed, interrogator 12 may identify the location of a strain introduced in optical waveguide 102 by SMA elements 106a and 106b through interferometry or time-of-flight measurement. Optical waveguide sensing system 10 is able to rapidly identify both distributed and local overheat events without the complexity or expense ordinarily associated with high resolution optical temperature sensing.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. In particular, although sensing elements 18*a* and 18*b* are described above as incorporating only a single strand of optical waveguide 102, alternative embodiments may include a plurality of parallel optical waveguides 102 for comparative interferometry. Therefore, it is intended that the invention not be limited to the particular embodiment(s) disclosed, but that the invention will include all embodiments falling within the scope of the appended claims.

The invention claimed is:

1. A temperature sensing system comprising:
   an optical waveguide;
   a shape memory alloy (SMA) element deformable as a function of temperature, and at least partially surrounding at the optical waveguide; and
   an interrogator configured to detect distributed temperature along the optical waveguide using spectroscopy and configured to detect strain in the optical waveguide induced by deformation of the SMA sheath to identify local hot spots along the optical waveguide.

2. The temperature sensing system of claim 1, wherein the spectroscopy has spatial resolution less than twice a minimum hotspot width.

3. The temperature sensing system of claim 1, wherein the spectroscopy has spatial resolution less than 30 cm.

4. The temperature sensing system of claim 1, wherein the SMA sheath is a tube of SMA material surrounding at least a section of the optical waveguide.

5. The temperature sensing system of claim 1, wherein the SMA sheath is a coil or spring of SMA material entwined about at least a section of the optical waveguide.

6. The temperature sensing system of any preceding claim, wherein the spectroscopy is strain-insensitive, and wherein detecting strain comprises polarization-based or intensity-based strain sensing.

7. The temperature sensing system of claim 6, wherein the spectroscopy uses Raman scattering techniques.

8. The temperature sensing system of any of claims 1 to 5, wherein the spectroscopy uses Rayleigh or Brillouin scattering spectroscopy with cross sensitivity to strain.

9. The temperature sensing system of any of claims 1 to 5, wherein the SMA sheath is configured to deform at a critical temperature equal to a local overheat temperature alarm threshold and thereby strain the optical waveguide.

10. The temperature sensing system of claim 9, wherein the SMA sheath is configured to constrict at the critical temperature and thereby compress the optical waveguide.

11. The temperature sensing system of claim 9, wherein the SMA sheath is configured to bend at the critical temperature, thereby bending or kinking the optical waveguide sensing element.

12. The temperature sensing system of any of claims 1 to 5, wherein the optical waveguide is one of a plurality of optical waveguides, and further comprising an optical switch configured to cycle through the plurality of optical waveguides.

13. The temperature sensing system of claims 1 to 5, wherein the interrogator comprises:
   a light source configured to transmit light down the optical waveguide;
   a detector configured to sense relative shifts in spectrographic characteristics of the optical waveguide; and
   a data processor configured to correlate the relative shifts in spectrographic characteristics of the optical waveguide with changes in strain and temperature in the optical waveguide.

* * * * *